(12) United States Patent
Borcherding

(10) Patent No.: US 6,475,078 B1
(45) Date of Patent: Nov. 5, 2002

(54) AIR VENTILATING DEVICE

(76) Inventor: Norb Borcherding, 2602 Hacienda Dr., Dubuque, IA (US) 52002

( * ) Notice: Subject to any disclaimer, the term of this patent is extended or adjusted under 35 U.S.C. 154(b) by 0 days.

(21) Appl. No.: 09/682,711

(22) Filed: Oct. 9, 2001

(51) Int. Cl.[7] .............................................. F24F 13/06
(52) U.S. Cl. ..................... 454/259; 137/527.8; 454/360
(58) Field of Search ................................ 454/259, 353, 454/359, 360; 137/512.1, 527, 527.8

(56) References Cited

U.S. PATENT DOCUMENTS

| | | | | |
|---|---|---|---|---|
| 1,623,286 A | * | 4/1927 | Strahan | 454/259 |
| 2,588,289 A | * | 3/1952 | Pouliot | 454/359 |
| 5,191,913 A | * | 3/1993 | Scaramucci | 137/454.2 |
| 5,236,391 A | * | 8/1993 | Schaefer | 454/253 |
| 5,277,658 A | * | 1/1994 | Goetti | 137/512.1 |
| 5,775,988 A | * | 7/1998 | Eakin | 454/253 |

OTHER PUBLICATIONS

Double L Group Ltd., "Jet Ventilation Creates a More Uniform Environment Through Mixing, Let's Talk . . . ," 1998, 4 pages.

* cited by examiner

*Primary Examiner*—Harold Joyce
(74) *Attorney, Agent, or Firm*—James C. Nemmers; Douglas J. Stilwell

(57) ABSTRACT

An air inlet device for use in automatically providing ventilation to the interior of buildings. The device has one of more openings each of which has a moveable louver pivoted at the lower side of the opening with the louver extending upwardly so that the inlet air is directed upwardly toward the ceiling of the building. Each louver extends beyond its lower pivot point and contains means for attaching weights of different amounts to the louver depending upon the static pressure within the building thereby allowing adjustment of the air flow in accordance with the static pressure.

4 Claims, 5 Drawing Sheets

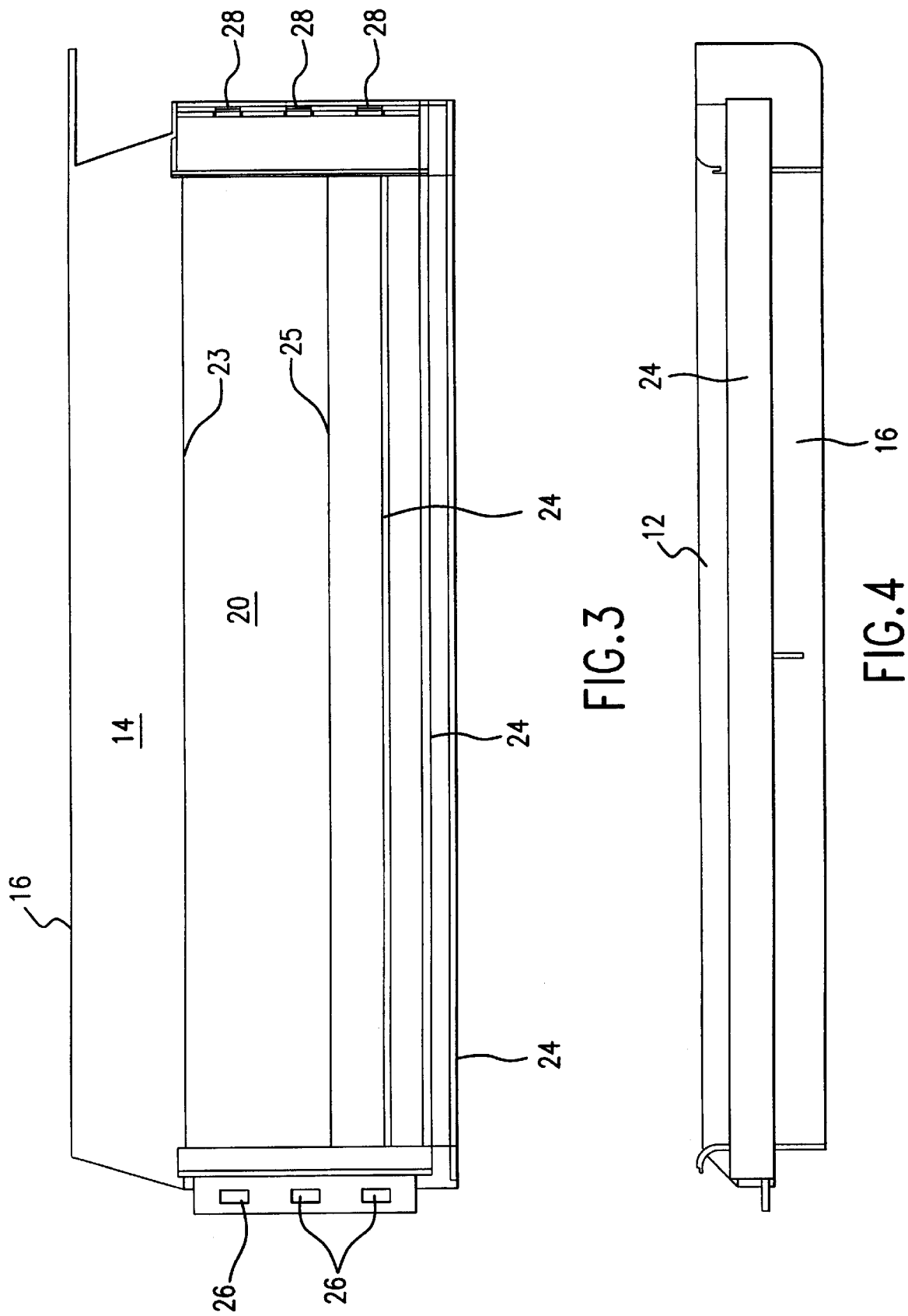

AIR VENTILATING DEVICE

BACKGROUND OF INVENTION

Ventilating the interior of buildings is highly desirable and essential wherever living creatures or plants are being maintained. For example, the interior conditions must be controlled in buildings used for warehousing or industrial storage, for the raising of vegetables and plants or for raising livestock. For those buildings where livestock are being raised, proper interior ventilation is essential to the good heath of the livestock. During the winter, buildings will most likely be cool and damp if the building is located in the northern climates. In the summer, the interior of the building will likely be hot and humid. Ventilation is a process to control the temperature, humidity and gases within the building, and with controlled ventilation, a near ideal environment can be maintained by introducing outside air and properly controlling the heat and moisture of the air circulating within the building.

As air circulates throughout the interior of a building, the temperature of the air and the amount of water it carries may increase or decrease. One of the most effective ways of maintaining desirable conditions of the air inside of a building is to distribute fresh air from the exterior and mix it with the existing air within the building. In order to do this, the building must contain inlets that control the flow and distribution of the fresh air introduced into the building. The use of proper inlets is much more effective than using fans to blow air into the building. By the strategic placement of inlets of a proper design that utilize static pressure, the exterior air can be mixed with the interior air in a building to dilute stagnant pockets of either cold or hot air and dilute any toxic gases present within the building. In relatively large buildings, mixing by inlets may not be sufficient to produce the required air movement and in such a case, stir fans may be added for additional mixing of the air within the building. By providing the necessary velocity of air and movement within the building by proper use of air inlets, a more uniform environment from top to bottom and from the end of the building can be maintained.

There are known and used numerous designs of air inlet devices for mounting on the walls or ceiling of a building. These devices typically contain one or more moveable louvers the position of which can be changed by manual control cables. Some devices have louvers that operate automatically in response to the negative pressure supplied by exhaust fans. However, the design of known air inlet devices of the automatic type are typically designed for a given set of conditions and cannot be adjusted to accommodate different building designs and different static pressures. There is therefore a need for an improved air inlet device which can be adjusted to accommodate different static pressures and air flows within the building where the inlet device is installed. There is also a need for an improved air inlet device which when mounted in the wall or ceiling will direct the air upwardly toward the ceiling so that the colder incoming air is properly mixed with room air before dropping to the lower portions of the building where the animals confined in the building are situated, thus helping to prevent chilling of the animals.

SUMMARY OF INVENTION

The air ventilating device of the invention has a housing suitable for mounting in the wall or ceiling of a building. The housing is provided with an opening to the exterior of the building and a moveable louver is pivoted at the lower side of the opening with the louver extending upwardly so that the exterior air is directed upwardly toward the ceiling of the building. The louver extends beyond the lower pivot point and contains means for attaching weights of different sizes to the louver depending upon the static pressure within the building thereby allowing adjustment of the air flow in accordance with the static pressure.

BRIEF DESCRIPTION OF DRAWINGS

FIG. 3 is a rear elevational view of the air inlet device with the louver removed;

FIG. 4 is a bottom view of the air inlet device of FIG. 3;

DETAILED DESCRIPTION

Figure 1:
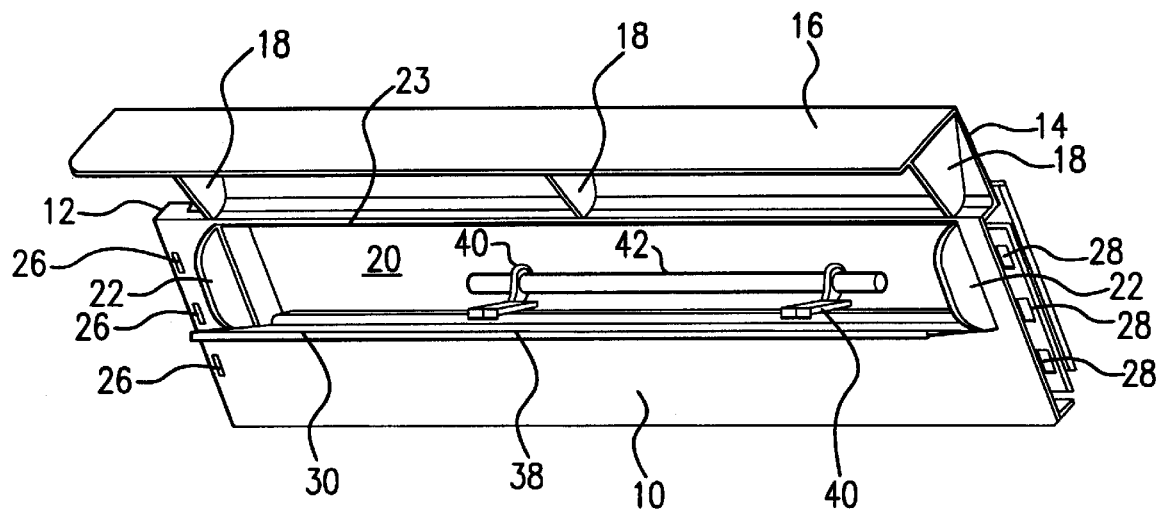
FIG. 1 is a perspective view of the front of an air inlet device constructed according to the principles of the invention showing the louver in the open position.

Referring now to the drawings, there is shown a preferred embodiment of the invention of a single louver inlet that can be mounted in the side wall of a building, as is well known to those skilled in the art, or the inlet device can also be assembled into a four louver unit and mounted in a ceiling in the manner described hereinafter.

Figure 2:
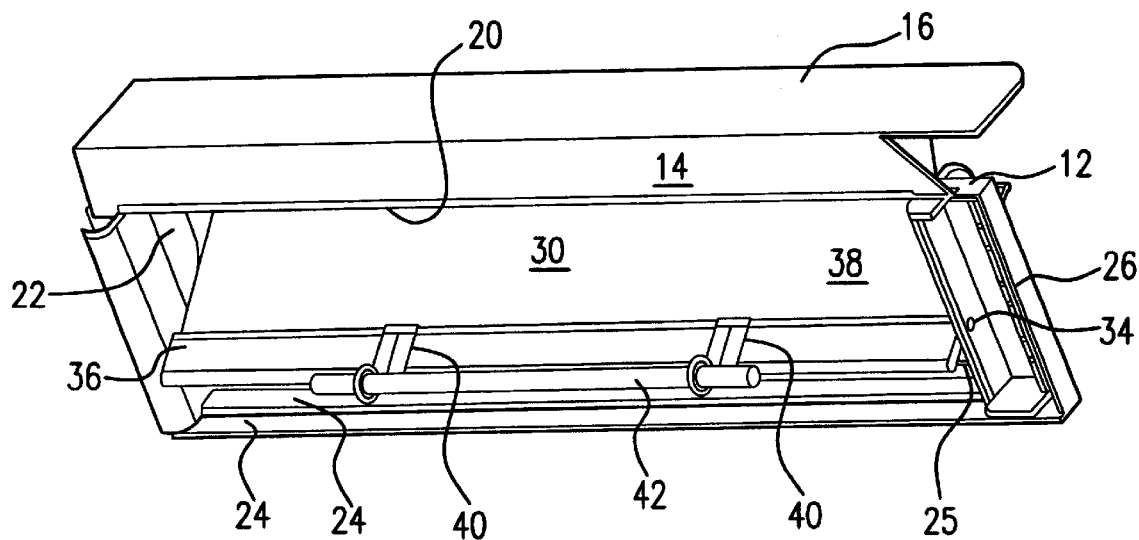
FIG. 2 is a perspective view of the rear of the air inlet device of FIG. 1.
Figure 5:
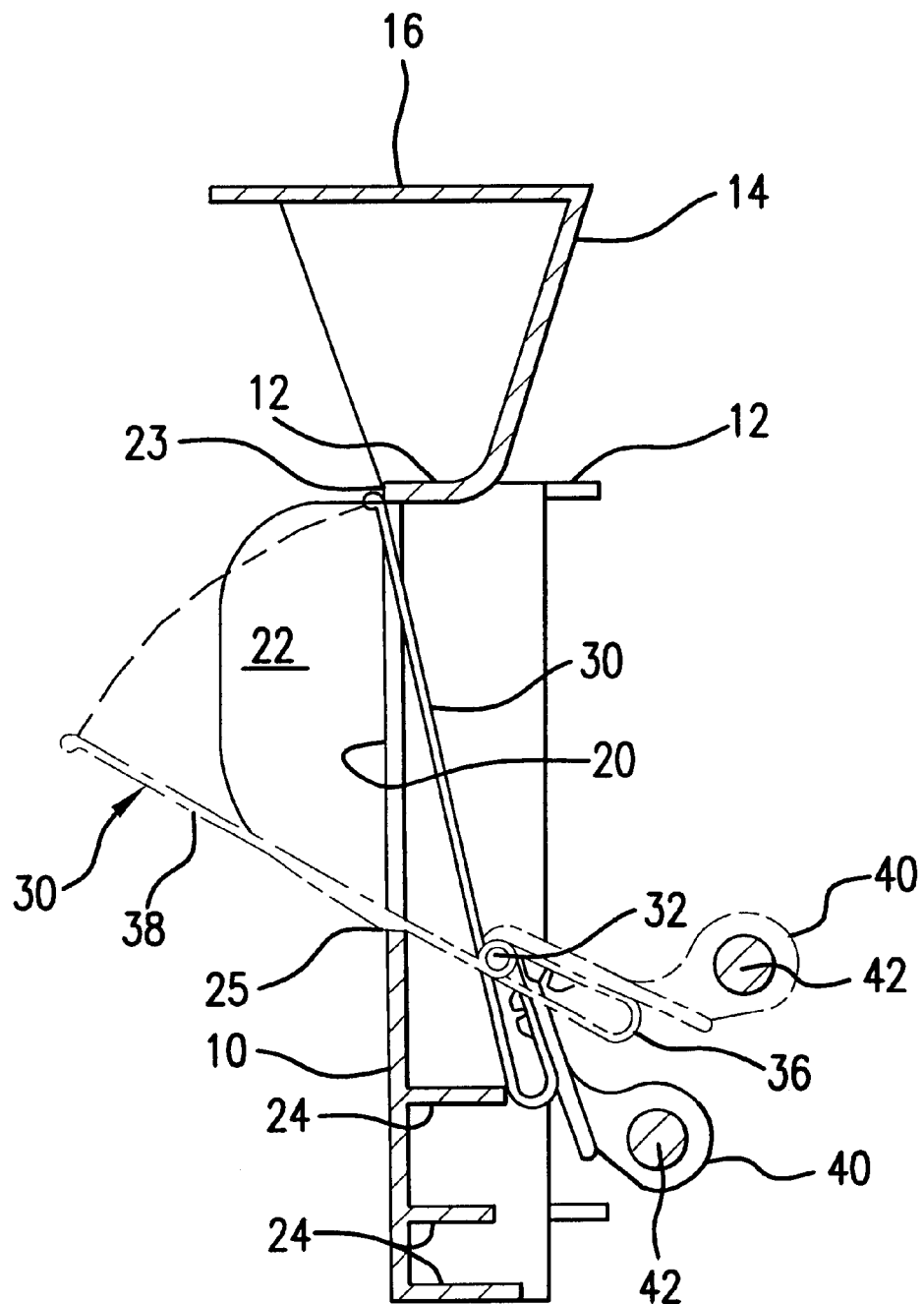
FIG. 5 is a side elevational view partly in section and illustrating the movement of the louver between open and closed positions.

Referring now to the drawings, there is shown in FIGS. 1–5 a single louver air inlet unit incorporating the principles of the invention and of the type wherein four such units can be connected together at their ends to form a square shaped unit for mounting in the ceiling of the building to be ventilated. Each such unit has a housing formed with upper, lower and side portions with a front face plate 10 extending between the portion in a substantially vertical orientation when the unit is installed in the wall or ceiling of a building. At the upper portion of the housing, the face plate 10 is formed with a rearwardly extending flange 12, an upwardly extending flange 14, and a forwardly extending top flange 16. Flanges 12, 14 and 16 form a somewhat U-shaped structure as best seen in FIGS. 1 and 5. Reinforcing plates 18 extend between the flange 12 and the top flange 16. Just beneath the flange 12, the face plate 10 has a rectangular ventilating opening 20 having an upper edge 23 and a lower edge 25 formed in it with outwardly extending tabs 22 at each side of the opening. Longitudinally extending strengthening members 24 extend along the rear of the face plate 10 beneath the opening 20 as best seen in FIGS. 2 and 5.

Figure 6:
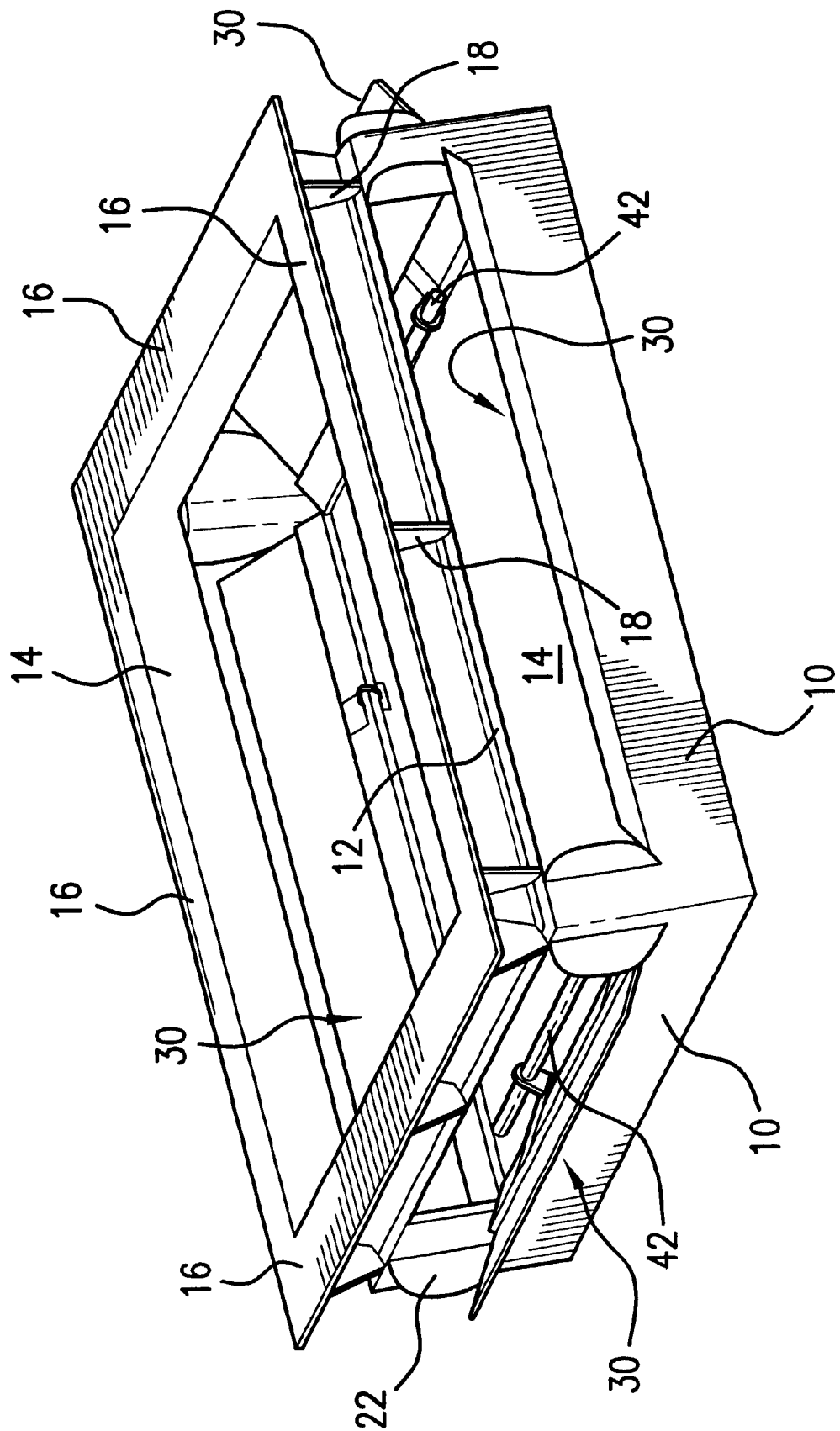
FIG. 6 is a perspective view of an assembled unit having four louvers for mounting in a ceiling.

At the left side of the housing of each unit there are formed locking tabs 26 extending rearwardly from the face plate 10. On the right side of each the housing of each unit there are formed locking openings 28 spaced to receive the locking tabs 26 when two of the units are joined together by snapping the locking tabs 26 into the locking openings 28 of an adjoining unit. It will be understood that four such units would be joined at their ends to form a square ventilating device as shown in FIG. 6 which device can be mounted in the ceiling using the top flange 16 for mounting. It should also be understood however that a single ventilating device could be mounted directly in the side wall of a structure where this is a desired installation.

Each single ventilating device has a ventilating louver 30 mounted on a longitudinally extending pivot pin 32, (see FIG. 5) the ends of which pin 32 extend into openings 34 in the end tabs 22. The ventilating louver 30 has an inwardly extending portion 36 and an outwardly extending portion 38 such that when the louver is pivoted to the closed position shown in FIG. 5, the outwardly extending portion 38 will engage the front edge of flange 12 while the inwardly extending portion 36 will engage the top one of the uppermost strengthening members 24 to close off the ventilating opening 20.

Mounted on the inwardly extending portion 36 of the louver 30 are a pair of brackets 40 that are adapted to receive a balancing rod 42. The balancing rod 42 is removable, and balancing rods of different weights can be utilized depending upon the specific static pressure existing in the building. The louver 30 should be closed when properly balanced. The greater the static pressure, the more weight that is required. When the pressure within the building exceeds the counter balancing of the rod 42, the louver 30 will open to admit outside air and direct the outside air upwardly toward the ceiling where it will mix with the warm air before dropping down toward the region where the animals reside. By thus mixing the warm air with the cooler outside air, the air is tempered before it reaches the animals and maintains a consistent environment without hot or cold spots.

Figure 5A:
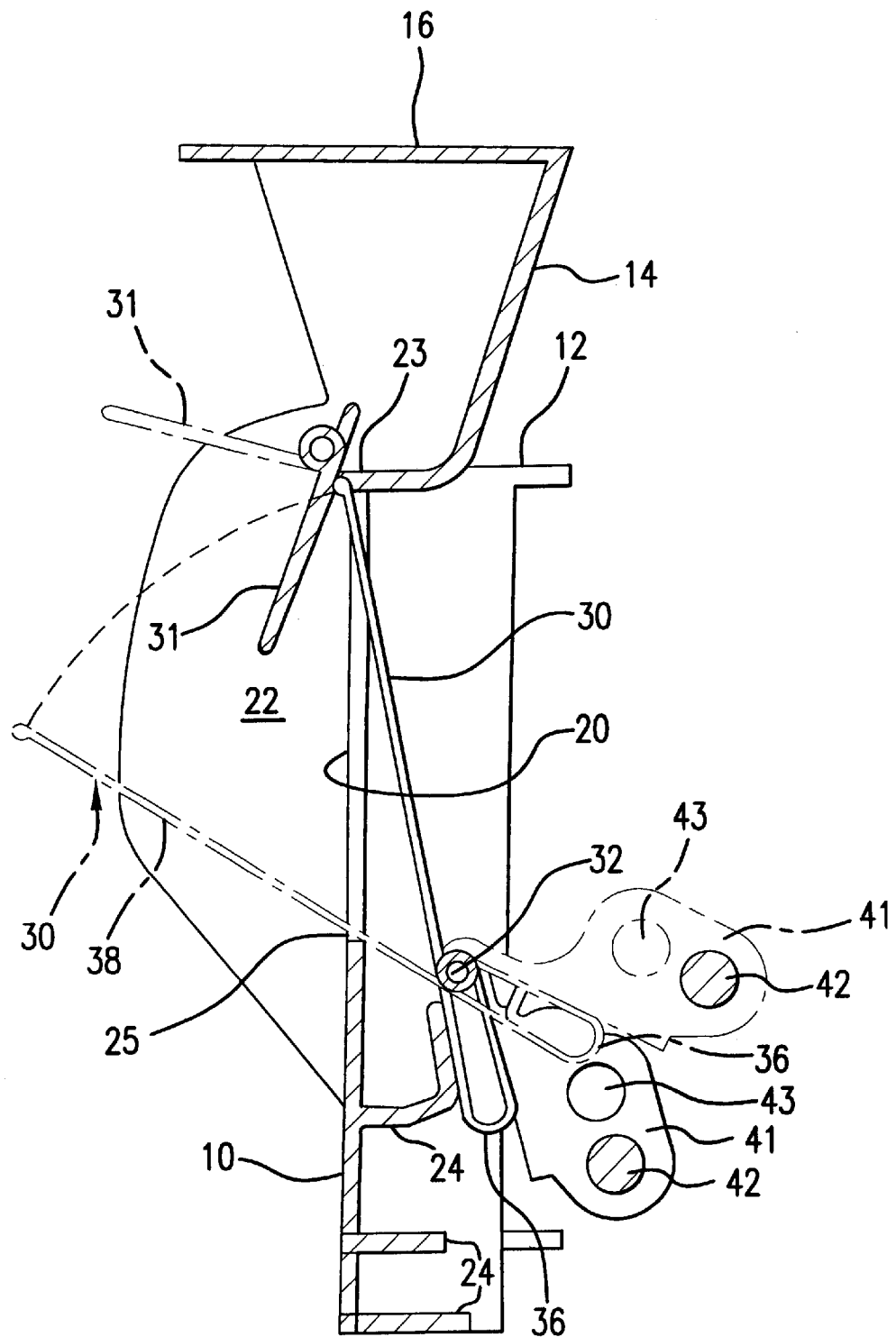
FIG. 5A is a side elevational view partly in section similar to FIG. 5 and illustrating an additional louver to close off the unit completely.

FIG. 5A shows a modified version of the unit shown in FIGS. 1–5 in that there is added to the unit a shut-off louver 31 pivotally mounted along the upper edge 23 of the ventilating opening 20 at the front edge of the flange 12. The shut-off louver 31 is used to completely close off and stop air flow through the unit with the ventilating louver 30 in the fully closed position, the shut-off louver 31 being moveable to hold the ventilating louver 30 in the closed position regardless of the air pressure within the building. FIG. 5A also shows modified brackets 41 which are the similar to brackets 40 of FIG. 5 except they are formed with a second opening 43 that is adapted to receive an additional balancing rod similar to rod 42.

As illustrated in FIG. 6, four of the units can be assembled together with a bottom plate 44 in place. With this arrangement, the assembled unit can be mounted in the ceiling of a building with air being directed outwardly from the four sides of the unit upwardly toward the ceiling. It will be understood however that single units can be mounted in a side wall where desired.

From the foregoing description, it will be evident to those skilled in the art that the invention provides a simple, relatively inexpensive unit to provide and control the flow of outside air automatically into the interior of the structure with the air first being directed upwardly to mix with the warm air at the top of the structure and thereby minimize hot and cold spots within the building. The principles of the invention can be applied to single units for sidewall mounting or to four units assembled into a rectangular, ceiling-mounted unit with four ventilating louvers.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. An air ventilating unit for use in automatically providing air flow from the exterior of a building to the interior of the building having walls and a ceiling, said device comprising:

a housing adapted to be mounted in a wall or the ceiling of the building and having an upper portion, a lower portion and side portions extending between the upper portion and the lower portion;

a vertically extending face plate between the upper, lower and side portions of the housing and having a ventilating opening in the face plate providing communication to the exterior of the building, the ventilating opening having an upper edge and a lower edge;

a moveable ventilating louver pivoted at the lower edge of the ventilating opening from an open position providing for air flow from the exterior of the building to a closed position in which air flow from the exterior of the building is blocked; the ventilating louver having an upwardly extending portion of sufficient length to engage the upper edge of the opening when the ventilating louver is in a closed position to block air from flowing from the exterior of the building; the ventilating louver also having/an inwardly extending portion that extends beyond the pivot point of the ventilating louver; the upwardly extending portion of the ventilating louver extending upwardly and outwardly from the pivot of the ventilating louver so that air flowing from the exterior of the building is directed upwardly toward the ceiling of the building when the ventilating louver is in the open position;

a bracket having more than one opening combined with the inwardly extending portion of the ventilating louver;

and a balancing member received in one of the openings of the bracket, the balancing member being a horizontally extending rod and being of a selected weight depending upon the static pressure within the building so as to thereby provide for adjustment of the air flow through the ventilating opening from the exterior to the interior of the building in accordance with the static pressure within the building.

2. The air ventilating unit of claim 1 further comprising a structure in which the housing is provided with looking tabs at one of the side portions of the housing and locking openings at the other side of the housing, the locking openings being adapted to receive the locking tabs from a second unit to join the two units together when the two units are positioned to form one-half of four units joined to form a square ventilating device adapted to be mounted in the ceiling of the building.

3. An air ventilating unit for use in automatically providing air flow from the exterior of a building to the interior of the building having walls and a ceiling, said device comprising:

a housing adapted to be mounted in a wall or the ceiling of the building and having an upper portion, a lower portion and side portions extending between the upper portion and the lower portion;

a vertically extending face plate between the upper, lower and side portions of the housing and having a ventilating opening in the face plate providing communication to the exterior of the building, the ventilating opening having an upper edge and a lower edge;

a moveable ventilating louver pivoted at the lower edge of the ventilating opening from an open position providing for air flow from the exterior of the building to a closed position in which air flow from the exterior of the building is blocked; the ventilating louver having an upwardly extending portion of sufficient length to engage the upper edge of the opening when the ventilating louver is in a closed position to block air from flowing from the exterior of the building; the ventilating louver also having an inwardly extending portion that extends beyond the pivot point of the ventilating louver; the upwardly extending portion of the ventilating louver extending upwardly and outwardly from the pivot of the ventilating louver so that air flowing from the exterior of the building is directed upwardly toward the ceiling of the building when the ventilating louver is in the open position;

a bracket combined with the inwardly extending portion of the ventilating louver;

a balancing member of a selected weight depending upon the static pressure within the building combined with the bracket thereby providing for adjustment of the air flow through the ventilating opening from the exterior to the interior of the building in accordance with the static pressure within the building;

and a shut-off louver pivotally mounted at the upper edge of the ventilating opening, the shut-off louver being moveable from a first position, allowing free pivotal movement of the ventilating louver between a closed position to an open position, to a second position holding the ventilating louver in a fully closed position.

4. The air ventilating unit of claim 3 further comprising a structure in which the housing is provided with locking tabs at one of the side portions of the housing and locking openings at the other side of the housing, the locking openings being adapted to receive the locking tabs from a second unit to join the two units together when the two units are positioned to form one-half of four units joined to form a square ventilating device adapted to be mounted in the ceiling of the building.

* * * * *